United States Patent
Goncalves Do Curral et al.

(10) Patent No.: US 11,192,206 B2
(45) Date of Patent: Dec. 7, 2021

(54) METHOD FOR PRODUCING A COHESIVE LASER BOND CONNECTION AND APPARATUS FOR FORMING A LASER BOND CONNECTION

(71) Applicant: Robert Bosch GmbH, Stuttgart (DE)

(72) Inventors: Andreas Alves Goncalves Do Curral, Tabarz (DE); Andreas Heider, Stuttgart (DE); Bernd Jahrsdoerfer, Herleshausen (DE); Christoph Bantel, Ditzingen (DE); Emilia Schwindt, Stuttgart (DE); Friedhelm Guenter, Burgstetten (DE); Nathanael Eisenreich, Leonberg (DE); Ronny Wolf, Eisenach (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 16/434,348

(22) Filed: Jun. 7, 2019

(65) Prior Publication Data

US 2019/0375048 A1  Dec. 12, 2019

(30) Foreign Application Priority Data

Jun. 8, 2018 (DE) .......................... 102018209143.9

(51) Int. Cl.
| | | |
|---|---|---|
| *B23K 26/20* | (2014.01) | |
| *B23K 26/32* | (2014.01) | |
| *B23K 26/242* | (2014.01) | |
| *B23K 26/00* | (2014.01) | |
| *B23K 26/06* | (2014.01) | |
| *B23K 31/00* | (2006.01) | |
| *B23K 26/03* | (2006.01) | |

(Continued)

(52) U.S. Cl.
CPC ........ *B23K 26/242* (2015.10); *B23K 26/0093* (2013.01); *B23K 26/032* (2013.01); *B23K 26/0626* (2013.01); *B23K 31/00* (2013.01); *H01M 50/543* (2021.01); *B23K 2101/38* (2018.08); *B23K 2103/12* (2018.08)

(58) Field of Classification Search
CPC .... B23K 26/20–302; B23K 26/32–323; B23K 2101/40
See application file for complete search history.

(56) References Cited

U.S. PATENT DOCUMENTS 5,210,391 A * 5/1993 Yoshie ................ G02B 6/4484
 219/121.63
6,288,361 B1 * 9/2001 Pircher .............. B23K 26/0846
 219/121.73

(Continued)

FOREIGN PATENT DOCUMENTS

DE  102015219229 A1  4/2017

OTHER PUBLICATIONS

English translation of DE 102015219229 (Year: 2015).*

*Primary Examiner* — Michael A LaFlame, Jr.
(74) *Attorney, Agent, or Firm* — Michael Best & Friedrich LLP

(57) ABSTRACT

Methods for producing a cohesive laser bond connection, wherein, in a first method step, a bond element (2) made from copper is provided, in a second method step, a contact element (3) made from copper is provided, and, in a third method step, the bond element (2) and the contact element (3) are connected to one another in a joined fashion under the action of green laser radiation (1).

16 Claims, 1 Drawing Sheet

(51) Int. Cl.
*H01M 50/543* (2021.01)
*B23K 103/12* (2006.01)
*B23K 101/38* (2006.01)

(56) References Cited

U.S. PATENT DOCUMENTS

| | | | | |
|---|---|---|---|---|
| 9,455,185 | B1* | 9/2016 | Gluschenkov | C22F 1/10 |
| 2008/0072423 | A1* | 3/2008 | Finn | G06K 19/07779 |
| | | | | 29/854 |
| 2009/0068598 | A1* | 3/2009 | Murase | B23K 26/40 |
| | | | | 430/311 |
| 2010/0104928 | A1* | 4/2010 | Nishino | H01M 50/502 |
| | | | | 429/53 |
| 2013/0105558 | A1* | 5/2013 | Abe | H01L 24/81 |
| | | | | 228/179.1 |
| 2013/0141467 | A1* | 6/2013 | Han | G06T 11/60 |
| | | | | 345/660 |
| 2015/0099152 | A1* | 4/2015 | Bantel | B23K 26/32 |
| | | | | 429/121 |
| 2015/0269471 | A1* | 9/2015 | Finn | G06K 19/07794 |
| | | | | 235/492 |
| 2015/0269472 | A1* | 9/2015 | Finn | G06K 19/07794 |
| | | | | 235/492 |
| 2017/0028507 | A1* | 2/2017 | Tsukui | B23K 26/0676 |
| 2018/0335060 | A1* | 11/2018 | Miyashiro | B23K 26/28 |

\* cited by examiner

METHOD FOR PRODUCING A COHESIVE LASER BOND CONNECTION AND APPARATUS FOR FORMING A LASER BOND CONNECTION

BACKGROUND OF THE INVENTION

The invention proceeds from a method for producing a cohesive laser bond connection.

Another subject of the present invention is an apparatus for forming a laser bond connection.

It is known in principle from the prior art that a bonding process for forming an electrically conductive connection between a first contact element and a second contact element by means of a bond connection is divided into the following phases:
1) producing a bond connection between the bond element and a first contact element,
2) deforming the bond element,
3) producing a bond connection between the bond element and a second contact element, differing from the first contact element, and
4) severing the bond element at a location of the bond element that is not located between the first contact element and the second contact element.

In particular when producing a connection between two elements each made from copper that are connected together by means of laser welding, the problem arises that it is possible for spatter to unpredictably occur.

Furthermore, welding depths that vary and/or the requirement of an introduction of high amounts of energy are a problem in such connections of copper to copper.

When processing copper, there is furthermore the problem of the large number of possible process instabilities and of the low degree of possible energy input coupling.

SUMMARY OF THE INVENTION

A method for producing a cohesive laser bond connection according to the invention offers the advantage that a bond element made from copper and a contact element made from copper can be reliably connected to one another, wherein said problems of the prior art can also be reduced.

It is possible in particular to form connections between a bond element made from copper and a contact element made from copper by means of a laser joining process with an increased process stability and lower use of energy than in methods known from the prior art.

To this end, a method for producing a cohesive laser bond connection is provided according to the invention.

In a first method step, a bond element that is made from copper or is being made from copper is provided.

In a second method step, a contact element that is made from copper or is being made from copper is provided.

In a third method step, the bond element and the contact element are connected to one another in a joined fashion under the action of green laser radiation.

Green laser radiation should at this point be understood to mean laser radiation having a wavelength that lies in the range of the wavelength of green light, that is to say a wavelength between approximately 490 nm and 575 nm. A wavelength of green laser radiation of 532 nm is particularly preferred here.

The use of green laser radiation here offers the particular advantage that heat conduction welding can be implemented.

It is possible using such heat conduction welding for a reliable electrical contact-connection between a bond element made from copper and a contact element made from copper to be formed.

Heat conduction welding differs from a deep welding method that is currently implemented for connecting copper to copper.

The deep welding method has the problems already mentioned in the introductory part of spatter formation and of variations in the welding depth.

Heat conduction welding can eliminate these problems, and as a consequence, laser bonding by means of a method according to the invention can also be suitable for connections between copper and copper in series.

It is thus possible for example in series to reduce the number of components that do not satisfy the requirements due to spatter formation.

Furthermore, it should be noted again that fluctuations in the welding depth can be reduced.

It is particularly advantageous that in heat conduction welding, the formation of a vapor capillary can be dispensed with.

In this way, the process instability arising due to a vapor capillary is thus avoided due to the lack of such a vapor capillary.

The use of green laser radiation furthermore offers the particular advantage that the absorptance of the copper for the laser radiation can be increased as a result.

It should also be noted at this point that a laser bond connection is understood to refer to a connection formed by means of laser bonding, wherein laser bonding is a combining method in which the connection is formed by means of a laser joining process or a laser welding process.

Laser bonding thus differs for example from ultrasonic bonding, in which the connection is formed by way of an ultrasonic joining process.

Furthermore, in a method performed by way of laser bonding, different and new application possibilities thus arise.

Preferably, the bond element and the contact element are connected immediately or directly to one another.

An immediate or direct connection of the bond element and the contact element to one another is understood to mean that they are connected immediately or directly to one another without a further intermediate element.

The bond element advantageously has a cross-sectional area arranged perpendicularly to a longitudinal direction of the bond element.

The cross-sectional area of the bond element has a square, rectangular, or round shape.

It is thus possible to make available different embodiments of a bond element that can be adapted to the respective requirements.

It is also advantageous if the bond element has a width that is arranged perpendicularly to a longitudinal direction of the bond element.

The width of the bond element here has a value of less than 5 cm.

The width of the bond element preferably has a value of less than 1 cm.

The width of the bond element in particular has a value of less than 0.5 cm.

For example, the width of the bond element can have a value of 0.1 cm.

It is possible here for example with greater cross-sectional areas or greater widths when using a bond element in a battery module to make available sufficient conduction of the electrical current.

According to an advantageous aspect of the invention, the contact element provided in the second method step is a voltage tap of a battery cell of a battery module or a monitoring system of a battery module or of a power electronics system.

A monitoring system of a battery module is here to be understood to mean for example circuit carriers or circuit boards, such as circuit boards made of low-temperature co-fired ceramics or high-temperature co-fired ceramics.

For example, it is possible to connect battery cells of a battery module to one another serially and/or in parallel in an electrically conductive manner.

It is furthermore possible for example to connect a battery cell electrically conductively to the monitoring system of the battery module.

Overall it is possible using a method according to the invention to electrically contact battery cells of a battery module and/or to electrically conductively connect individual battery cells of a battery module to one another, as a result of which the battery cells can be connected in a flexible manner to form a battery module having a multiplicity of battery cells which are electrically conductively connected.

In particular, such a battery module can be used for a vehicle battery.

It is here thus possible using a method according to the invention to electrically and mechanically connect, in a welded form, bond elements made from copper with increased reliability to contact elements made from copper, for example circuit boards of battery modules which frequently have only a low thickness.

In particular, the bond element provided in the first method step here has a first end and a second end.

Furthermore, the first end can here be connected in a joined fashion to the voltage tap of a battery cell, and the second end can be connected in a joined fashion to the voltage tap of a further battery cell.

Consequently, an electrically conductive connection between the battery cell and the further battery cell is possible.

Furthermore, the first end can be connected in a joined fashion to the voltage tap of a battery cell, and the second end can be connected in a joined fashion to the monitoring system of the battery module.

Electrical contact-connection of the battery cell is thus possible.

The bond element can here be provided for example as continuous material and be preferably wound onto a coil.

In a fourth method step, after a connection of the bond element to the contact element is produced, the bond element is advantageously severed at a location that is not connected to the contact element.

It is thus possible to make available the bond element from a continuous material.

The invention further also relates to an apparatus that is embodied to produce a laser bond connection.

The apparatus here has a first receptacle that is embodied for guiding a bond element made from copper.

The apparatus here has a second receptacle that is embodied for holding a contact element made from copper.

The apparatus furthermore has a laser unit which is embodied to create a green laser beam.

The first receptacle and the second receptacle are here arranged moveably relative to one another in order to permit the formation of a joined connection of the bond element and of the contact element to one another by means of the green laser beam of the laser unit.

BRIEF DESCRIPTION OF THE DRAWINGS

Embodiments of the invention are illustrated in the drawings and will be explained in more detail in the following description.

In the drawings

DETAILED DESCRIPTION

It is possible using the method according to the invention to cohesively connect bond elements made from copper and contact elements made from copper by means of laser bonding.

Figure 1:
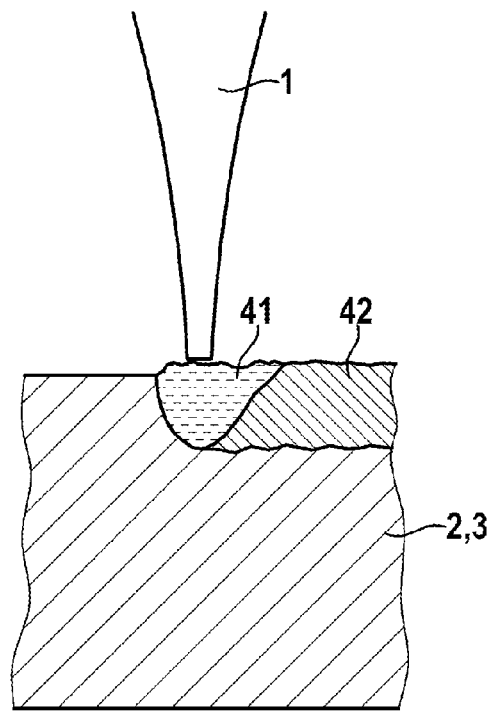
FIG. 1 schematically shows the embodiment of a heat conduction welding method, and FIG. 2 schematically shows the realization of a deep welding method.

In this respect, FIG. 1 schematically shows the performance of a heat conduction welding method on which the method according to the invention is based.

Here, as already described, a laser welding method or laser joining method is used for forming a connection, wherein the wavelength of the used laser beam lies in the range of green light and particularly preferably has a value of 532 nm.

FIG. 1 shows here the used laser beam 1.

Figure 2:
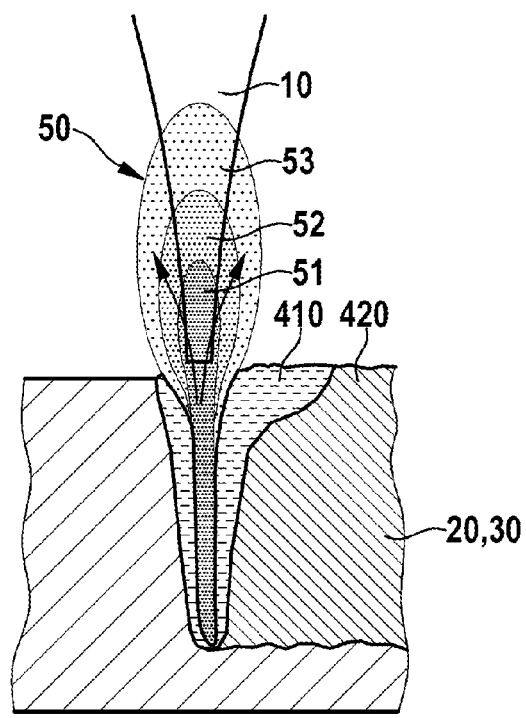

FIG. 2 furthermore shows one of the two elements that are to be connected to one another, that is to say either a bond element 2 or a contact element 3.

The action of the laser beam 1 is selected here such that the evaporation temperature of copper is not exceeded.

This can be achieved for example by way of combining power and advancement of the laser beam 1 or the duration of their radiation with the laser beam 1.

It is of course also possible to install suitable temperature controls, for example the installation of temperature sensors on the surface of the element to be connected.

It is furthermore also possible to change the intensity of the laser beam 1 by way of targeted focusing.

Consequently, evaporation of the copper is avoided, which is critical for heat conduction welding.

The action of the laser beam 1 is furthermore selected here such that the copper material is locally melted.

In FIG. 1, reference sign 41 denotes a melt zone in which the copper material is present in liquid form, and reference sign 42 denotes a melt zone in which the copper material exists in solid form.

The second element (not shown in FIG. 1) of the two elements that are to be connected to one another, that is to say either a contact element or a bond element, is arranged here such that it is molten locally due to heat conduction alone, also referred to as conduction.

Consequently, the two elements, that is to say a bond element and a contact element, can subsequently be connected to one another.

To ensure there is sufficient area for the connection of the two joining partners, it is possible for example for larger areas to be connected to one another or for multiple connecting locations to be formed at different locations.

It should also be noted at this point that FIG. 1 is merely intended to serve for the schematic illustration of heat conduction welding.

For the geometry of the weld seam formed, any desired and producible shape can be used.

FIG. 2 schematically shows a deep welding method known from the prior art.

Again, a bond element 20 or a contact element 30 can be seen here as one of the two elements to be connected.

A laser beam 10 is used here to locally melt the element that is to be connected.

This produces a melt zone, denoted with reference sign 410, with liquid copper material and a melt zone, designated with reference sign 420, with solid copper material.

It is clearly apparent from the comparison of FIGS. 1 and 2 that in heat conduction welding, the melt zones 41 and 42 are significantly smaller than the melt zones 410 and 420 during deep welding.

FIG. 2 furthermore also clearly shows that a distinctive vapor capillary 50 is formed, which can lead to process instabilities.

The vapor capillary 50 here comprises a first region 51 arranged partially inside the element that is to be connected and comprising a channel including plasma.

The vapor capillary 50 furthermore comprises a second region 52, which can be referred to as laser-induced plasma.

The vapor capillary 50 furthermore also comprises a third region 53, in which metal vapor can stream from the vapor capillary 5.

In such a method, a significantly increased welding depth as compared to heat conduction welding is formed.

It is assumed here in relation to many materials, although for example not for copper, that the process instabilities due to the vapor capillary 50 are controllable and the large welding depth produced is thus a predominant advantage.

It should be noted once again at this point that in the heat conduction welding shown in FIG. 1, which can be performed using a method according to the invention, no vapor capillary is produced, and as a result such process instabilities can be reduced.

As is furthermore apparent from a comparison of FIGS. 1 and 2, the welding depth in heat conduction welding is also significantly reduced.

Due to the lower welding depth in heat conduction welding, which depth can consequently also be made to be more constant, it is also possible for the formation of spatters to be reduced, which was already identified as a problem in the introductory part.

Overall, it is possible with heat conduction welding to thus form a reliable connection between a bond element made from copper and a contact element made from copper.

The invention claimed is:

1. A method for producing a cohesive laser bond connection, wherein
   in a first method step, a bond element (2) formed from copper is provided,
   in a second method step, a contact element (3) made from copper is provided,
   in a third method step, the bond element (2) and the contact element (3) are connected to one another in a joined fashion under the action of green laser radiation with a laser beam (1), and
   in a fourth method step, after the third method step, severing the bond element (2) at a location that is not connected to the contact element (3).

2. The method according to the preceding claim 1, characterized in that the green laser radiation (1) has a wavelength of 532 nm.

3. The method according to claim 1, characterized in that the bond element (2) and the contact element (3) are immediately connected to one another.

4. The method according to claim 1, characterized in that the bond element (2) has a cross-sectional area arranged perpendicularly to a longitudinal direction of the bond element (2), wherein the cross-sectional area of the bond element (2) has a square, rectangular, or round shape.

5. The method according to claim 1, characterized in that the bond element (2) has a width arranged perpendicularly to a longitudinal direction of the bond element (2), wherein the width of the bond element has a value of less than 5 cm.

6. The method according to claim 1, characterized in that the bond element (2) has a width arranged perpendicularly to a longitudinal direction of the bond element (2), wherein the width of the bond element has a value of less than 1 cm.

7. The method according to claim 1, characterized in that the bond element (2) has a width arranged perpendicularly to a longitudinal direction of the bond element (2), wherein the width of the bond element has a value of less than 0.5 cm.

8. The method according to claim 1, characterized in that the contact element (3), provided in the second method step, is a voltage tap of a battery cell of a battery module or a monitoring system of a battery module.

9. The method according to claim 1, characterized in that the bond element (2) provided in the first method step has a first end and a second end, wherein the first end is connected in a joined fashion to a voltage tap of a battery cell and the second end is connected in a joined fashion to a voltage tap of a further battery cell, or wherein the first end is connected in a joined fashion to a voltage tap of a battery cell and the second end is connected to a monitoring system of the battery module.

10. The method according to claim 1, characterized in that, during the third method step, the action of the laser beam (1) is selected in a manner such that the evaporation temperature of copper is never exceeded.

11. The method according to claim 2, characterized in that the bond element (2) and the contact element (3) are immediately connected to one another.

12. The method according to claim 11, characterized in that the bond element (2) has a cross-sectional area arranged perpendicularly to a longitudinal direction of the bond element (2), wherein the cross-sectional area of the bond element (2) has a square, rectangular, or round shape.

13. The method according to claim 12, characterized in that the bond element (2) has a width arranged perpendicularly to a longitudinal direction of the bond element (2), wherein the width of the bond element has a value of less than 0.5 cm.

14. The method according to claim 13, characterized in that the contact element (3), provided in the second method step, is a voltage tap of a battery cell of a battery module or a monitoring system of a battery module.

15. The method according to claim 14, characterized in that the bond element (2) provided in the first method step has a first end and a second end, wherein the first end is connected in a joined fashion to a voltage tap of a battery cell and the second end is connected in a joined fashion to a voltage tap of a further battery cell, or wherein the first end is connected in a joined fashion to a voltage tap of a battery cell and the second end is connected to a monitoring system of the battery module.

16. The method according to claim 15, characterized in that, during the third method step, the action of the laser beam (1) is selected in a manner such that the evaporation temperature of copper is never exceeded.

* * * * *